US009189859B2

(12) United States Patent
Vogiatis et al.

(10) Patent No.: US 9,189,859 B2
(45) Date of Patent: Nov. 17, 2015

(54) 3D IMAGE GENERATION

(75) Inventors: George Vogiatis, Cambridge (GB);
Carlos Hernandez, Cambridge (GB)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 956 days.

(21) Appl. No.: 13/377,712

(22) PCT Filed: Jun. 11, 2009

(86) PCT No.: PCT/GB2009/001473
§ 371 (c)(1),
(2), (4) Date: Mar. 5, 2012

(87) PCT Pub. No.: WO2010/142929
PCT Pub. Date: Dec. 16, 2010

(65) Prior Publication Data
US 2012/0147152 A1    Jun. 14, 2012

(51) Int. Cl.
*H04N 13/02* (2006.01)
*G06T 7/00* (2006.01)

(52) U.S. Cl.
CPC ............ *G06T 7/0065* (2013.01); *G06T 2200/24* (2013.01); *G06T 2207/10016* (2013.01); *G06T 2207/30208* (2013.01)

(58) Field of Classification Search
None
See application file for complete search history.

(56) References Cited

U.S. PATENT DOCUMENTS 5,179,441 A * 1/1993 Anderson et al. ............... 348/43
6,094,215 A * 7/2000 Sundahl et al. ................. 348/42
6,163,337 A * 12/2000 Azuma et al. .................. 348/43
6,300,078 B1 * 10/2001 Friend et al. ................ 435/6.15
2002/0061130 A1 * 5/2002 Kirk et al. .................... 382/154
2002/0061131 A1 * 5/2002 Sawhney et al. ............. 382/154
2003/0210461 A1 * 11/2003 Ashizaki et al. ............. 359/443

(Continued)

FOREIGN PATENT DOCUMENTS

EP        1 193 646 A2    4/2002
JP        9-187038 A      7/1997
JP        WO 2006/120759 A1    11/2006

(Continued)

OTHER PUBLICATIONS

Office Action issued Oct. 1, 2013 in Japanese Patent Application No. 2012-514524 with English language translation.

(Continued)

*Primary Examiner* — Mehrdad Dastouri
*Assistant Examiner* — James Anderson, II
(74) *Attorney, Agent, or Firm* — Oblon, McClelland, Maier & Neustadt, L.L.P.

(57) ABSTRACT

A system generating a 3D depth profile of an object, including: a moveable video camera to continually capture 2D image data of the object as the camera moves, to capture plural 2D image frames each including plural pixels; a processor configured to: receive the 2D image data; determine position of the camera when each frame is captured; calculate depth of part of an object shown in a pixel in a first frame with respect to a reference, by identifying the part in at least one further frame and calculating the depth using camera positions of the first image and at least one further image; and determine depth profile of the object, for plural parts of the object shown in the pixels. A display displays the depth profile and indicates in real time, as data is gathered, the parts of the object for which the depth profile has been calculated.

12 Claims, 7 Drawing Sheets

(56) References Cited

U.S. PATENT DOCUMENTS

2007/0171220 A1 7/2007 Kriveshko
2007/0236494 A1 10/2007 Kriveshko

FOREIGN PATENT DOCUMENTS

WO  WO 2006/120759 A1  11/2006
WO  WO 2007/084589 A2  7/2007

OTHER PUBLICATIONS

International Search Report issued Mar. 3, 2010 in Patent Application No. PCT/GB2009/001473.

V. Popescu et al., "The Model Camera", Graphical Models, vol. 68, No. 5-6, XP005731783, Nov. 1, 2006, pp. 385-401.
Szymon Rusinkiewicz et al., "Real-time 3D Model Acquisition", ACM Transactions on Graphics, Proceedings of ACM SIGGRAPH 2002, vol. 21, No. 3, XP002569538, Jul. 2002, pp. 438-446.
R. A. Lane et al., "Tutorial: Overview of Stereo Matching Research", Tina Memo. Internal, XP002355354, Dec. 1, 1998, pp. 1-10.
Ja Seong Ku et al., "Multi-image Matching for a General Motion Stereo Camera Model", Pattern Recognition, vol. 34, No. 9, XP004362596, Sep. 1, 2001, pp. 1701-1712.
Hans P. Moravec, "Rover Visual Obstacle Avoidance", International Joint Conference on Artificial Intelligence, XP002569539, 1981, pp. 785-790.

* cited by examiner (a)

(b)

(c)

(d)

3D IMAGE GENERATION

The present invention relates the fields of 3D image generation and 3D depth profiling. More specifically, the present invention is concerned with a system which can generate 3D images and depth profiles in real time.

The ability to produce 3D images is useful in a number of technical fields. The new generation of parking sensors use images of the surroundings to guide the driver while parking. In the field of animation and special effects for films and games, there is a need to be able to quickly produce an accurate depth map for a 3D object which is to be placed into the film or game. In the field of e-commerce, the provision of a 3D model of the article which is to be sold, allows a potential buyer to study the article. The ability to generate a 3D model can also be used for surveying, in architecture, the automotive industry or even in fields such as archaeology where it is desirable to be able to store and send 3D mages of artefacts.

Although 3D imaging technology exists most of the current systems allow the user to take the data to produce the image and then process the data at a later time. This has the drawback that it does not give a 3D image in real time, which makes it largely useless for parking sensors. Further, since the 3D image is produced after data acquisition, if more data is required to produce a good image, it is either too late or the process has to be started again. Finally, most current 3D systems require very large memory capacity and processing power.

Recently so-called SLAM (simultaneous localisation and mapping) systems have been developed which are used in robot vision. However, such systems tend to produce 3D meshes as opposed to depth profiles. In the SLAM 3D meshes, only the location of "important" feature points such as corners etc are generally determined. Therefore, such systems are not that useful where a full 3D depth profile of an object is required.

The present invention addresses the above problems and in a first aspect provides:

A system for generating a 3D depth profile of an object, the system comprising:
  a moveable video camera configured to continually capture 2D image data of said object as said camera is moved, said image data being captured as a plurality of 2D image frames where each frame comprises a plurality of pixels;
  a processor configured:
  to receive said 2D image data;
  to determine the position of the camera for each frame captured;
  to calculate the depth of the part of an object shown in a pixel in a first frame, said depth being determined with respect to a reference, said depth being determined by identifying said part of the object in at least one further frame and calculating the depth using the camera positions of said first image and said at least one further image; and
  to determine a depth profile of said object, the depth profile being determined for a plurality of parts of the object shown in said pixels,
  the system further comprises a display configured to display said depth profile and an indication in real time as data is still being gathered, the parts of the object for which the depth profile has been calculated.

In the first aspect, a depth profile is provided which can be used to either generate a 3D image of the object or can be used as data for animation etc. In the above method, no regularisation or other type of smoothing needs to be performed on the depth map.

The depth profile will be dense, in a preferred embodiment the processor attempts to determine the depth for adjacent pixels in said first frame.

Preferably, said depth is calculated by determining the similarity of a pixel in a first frame with a plurality of pixels in at least one further image of said plurality of frames, said plurality of pixels in a further image being located along a epipolar line in said further image, said epipolar line representing the possible depths of said part of the object. The depth is preferably measured from a reference located along said epipolar line. More preferably, the reference point is located at a general mid-point along said line. For example, if the object is located on a mat, then the reference point may be take to be lying on the epipolar line and a plane through the middle of said mat.

More preferably, the distance through which the camera has moved between said first frame and said further frame is used to determine the number of pixels along said epipolar line which are processed to determine their similarity in said further frame. This may be achieved by either specifically calculating the position of the camera or assuming that for adjacent frames the pixel position of the part of the object will have only moved by n number of pixels. The value of n can be chosen dependent on the processing constraints of the computer used. If processing power is limited then n can be chosen to be a smaller value.

The camera is preferably hand held.

The system may be configured to indicated the parts of the object for which the depth profile has been calculated, by showing the object being constructed on a screen. The display may give more sophisticated information, for example a confidence level on the points calculated so far.

In an embodiment, a matching score indicating the similarity of a pixel in the first image with a pixel in said second image is determined for the pixels along said epipolar line, and potential matches for said pixel in the first image are selected as local maxima for said matching score when dependent on depth.

The matching scores as a function of depth for a plurality of images can be combined to determine a single value for the depth of said part of object. The matching scores from further images for a given part of the object are continually collected until a depth is established.

In a plurality of calculations, one for each different part of the object will be performed at the same time. In a preferred embodiment, a fixed number of calculations will be performed at any one time, when one of said calculations converges to a depth measurement, a calculation for a further part of said object is initiated.

In a preferred embodiment, a criteria is also provided to determine if said distribution will not evolve to a substantially unimodal distribution such that said calculation may be stopped and a new calculation started.

In a preferred embodiment, the depth of a part of said object is calculated when the distribution of matching scores against depth for a plurality of images becomes substantially unimodal in character.

Thus, in a second aspect, the present invention provides a depth sensor for determining the depth of a part of an object from a reference, said system comprising:
  a moveable video camera configured to continually capture 2D image data of said object as said camera is moved, said image data being captured as a plurality of 2D image frames where each frame comprises a plurality of pixels;

a processor configured:

to receive said 2D image data;

to determine the position of the camera for each frame captured;

to identify the part of the object whose depth is to be measured in a first frame;

to determine matching scores indicating the similarity of a pixel showing said part of the object in a first frame with each of a plurality of pixels in a further frame as a function of the depth of said part of the object, said depth being determined using the camera positions of said first frame and said further frame;

obtaining the matching scores as a function of depth for a plurality of further frames and combining said matching scores as a function of depth with previously obtained matching scores;

continually monitoring the distribution of the matching scores as a function of depth as data from further frames is combined;

determining the depth of said part of said object when said distribution of the matching scores as a function of depth becomes substantially unimodal.

In an embodiment, the distribution of the matching score against depth is modelled as a mixture of a uniform distribution and a unimodal distribution. Preferably, the unimodal distribution is a Gaussian distribution A weighting may be given to said unimodal distribution, said weighting indicating the probability that the depth indicated by said unimodal distribution is a good measurement. The weighting may be used as an indication of confidence in the calculated depth.

For example:

$$P(x_t|Z,\pi)=\pi \times \text{unimodal}+(1-\pi)\text{Uniform}$$

Where Z is the depth of point x and $\pi$ is the weighting.

In a preferred embodiment the weighting may be shown on the display as a colour, the colour indicating the extent to which the distribution has converged to a unimodal distribution. The weighting may be compared with a threshold to determine if the distribution has converged. The weighting may also be compared with a second threshold to see if it is unlikely to converge and hence the calculation of the depth may be halted.

In a preferred embodiment, the parameters of said model are estimated using Bayesian Posterior Estimation. The model may be approximated by a distribution of the type:

$$C \times P(x_t|Z,\pi)p(Z,\pi|a_{t-1},b_{t-1},\mu_{t-1},\sigma_{t-1}^2)$$

where $x_t$ is the $t^{th}$ point, Z is the depth, $\pi$ is the weighting, a and b are parameters of a beta distribution and $\mu$ and $\sigma^2$ are the mean and standard deviation of said unimodal distribution.

The standard deviation may also be compared with a reference to determine if the depth value is a good measurement.

In either of the above two aspect, the matching score may be determined by a number of techniques such as Normalized Cross Correlation or Sum of Absolute differences.

The position of the camera may be determined by a number of techniques, for example techniques which derive the camera position from the object itself such as those used in SLAM systems. However, in a preferred embodiment, the object is located, said mat having a known pattern which is used to calculate the position of the camera for each frame. In a further preferred embodiment, said mat has a pattern comprising a plurality of circles.

In a third aspect, the present invention provides a method for generating a 3D depth profile of an object, the method comprising:

continually capturing 2D image data of said object using a moveable video camera said image data being captured as a plurality of 2D image frames where each frame comprises a plurality of pixels;

determining the position of the camera when each frame is captured;

calculating the depth of the part of an object shown in a pixel in a first frame, said depth being determined with respect to a reference, said depth being determined by identifying said part of the object in at least one further frame and calculating the depth using the camera positions of said first image and said at least one further image;

determining a depth profile of said object, the depth profile being determined for a plurality of parts of the object shown in said pixels, and displaying said depth profile and an indication in real time as data is still being gathered, the parts of the object for which the depth profile has been calculated.

In a fourth aspect, the present invention provides a method of determining the depth of a part of an object from a reference, said method comprising:

continually capturing 2D image data of said object using a moveable video, said image data being captured as a plurality of 2D image frames where each frame comprises a plurality of pixels;

determining the position of the camera when each frame is captured;

identifying the part of the object whose depth is to be measured in a first frame;

determining matching scores indicating the similarity of a pixel showing said part of the object in a first frame with each of a plurality of pixels in a further frame as a function of the depth of said part of the object, said depth being determined using the camera positions of said first frame and said further frame;

obtaining the matching scores as a function of depth for a plurality of further frames and combining said matching scores as a function of depth with previously obtained matching scores;

continually monitoring the distribution of the matching scores as a function of depth as data from further frames is combined; and determining the depth of said part of said object when said distribution of the matching scores as a function of depth becomes substantially unimodal.

The present invention can be implemented either in hardware or on software in a general purpose computer. Further the present invention can be implemented in a combination of hardware and software. The present invention can also be implemented by a single processing apparatus or a distributed network of processing apparatuses.

Since the present invention can be implemented by software, the present invention encompasses computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

As indicated above, the present invention can be used in a number of different fields. For example, the above system may form part of an e-commerce system. Thus, the present invention provides an e-commerce system comprising a system according to the first or second aspects of the present invention configured to produce a depth profile or image of an article for sale on said commerce system.

The present invention may also form part of a parking system, where a depth profile of the surroundings of a vehicle may be constructed. Thus the present invention also provides a parking system comprising a system in accordance with the first aspect of the present invention configured to produce a depth profile of the surroundings of the vehicle.

The present invention may also be used for surveying, architecture, archaeology where a 3D image or depth profile of surroundings, building or article are required.

The present invention may also be used in the field of animation and special effects where it is required to animate or otherwise place a 3D object in a film or game, a depth profile of said object being generated using any of the above systems or methods.

The present invention will now be described with reference to the following non-limiting embodiments in which.

Figure 3:
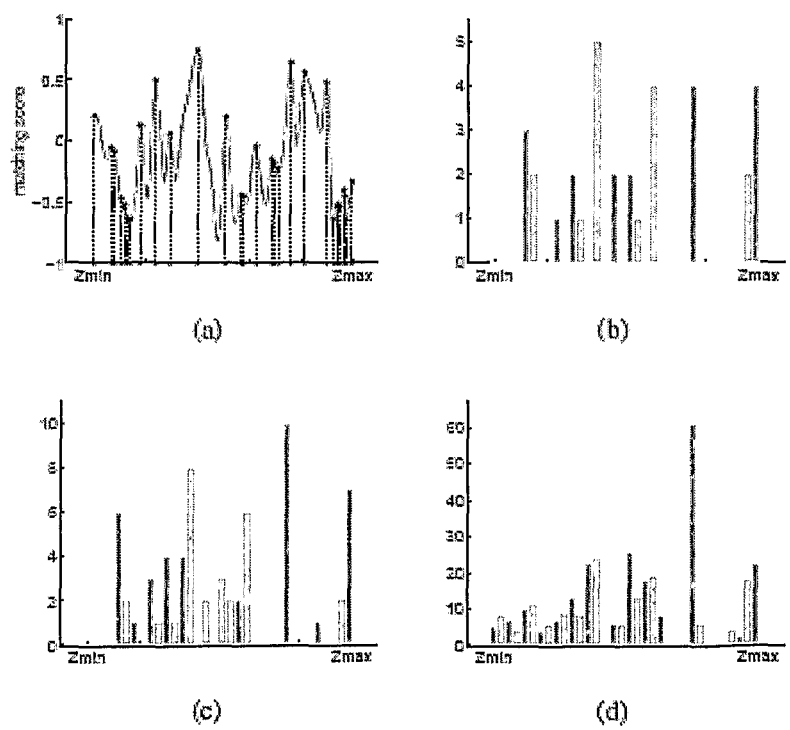
Figure 4:
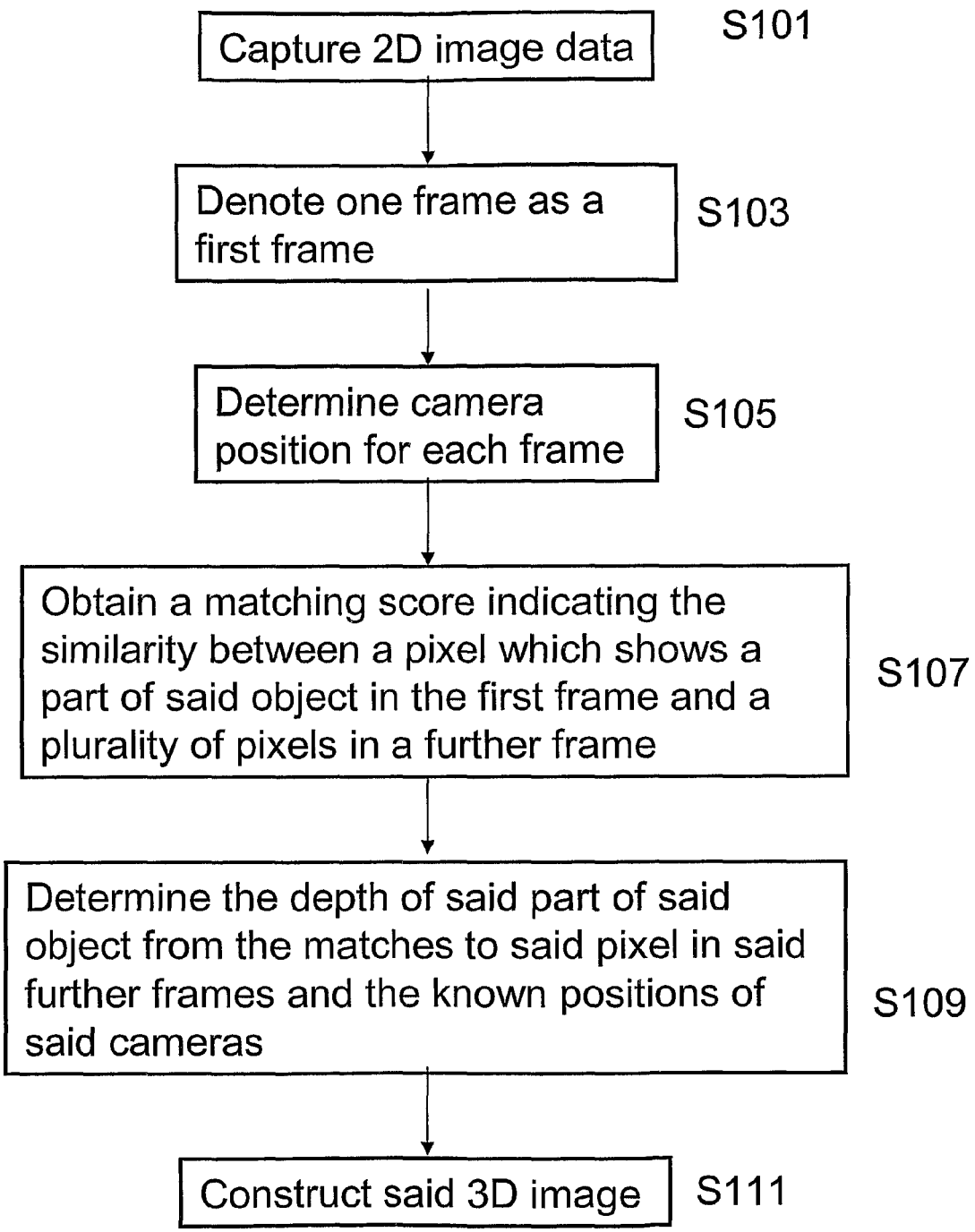
Figure 5:
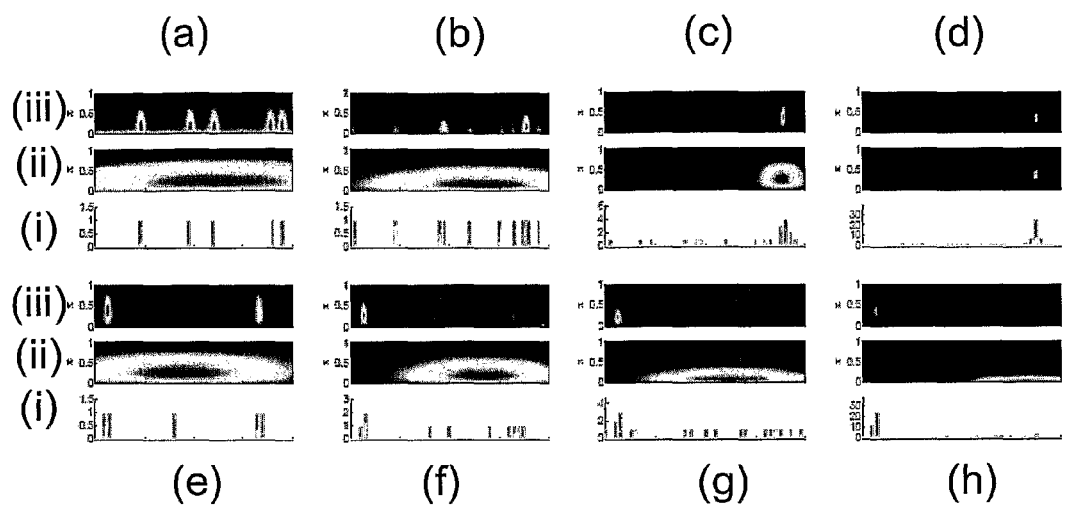
Figure 6:
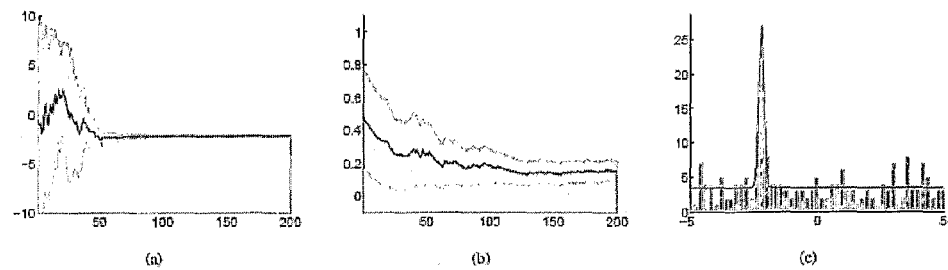
Figure 7:
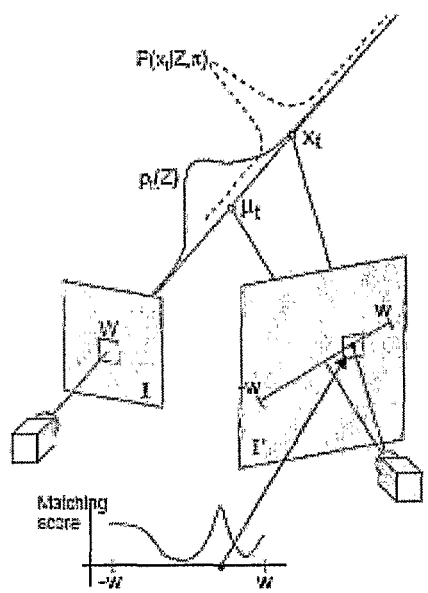

FIGS. 3a to 3d show plots of the matching score of a plurality of pixels against depth from a reference point for a pixel in a reference image I and further images, FIG. 3a shows the results for 1 further frame, FIG. 3b for 6 further frames, FIG. 3c for 15 further frames and FIG. 3d for 60 further frames;

FIG. 4 is a flow diagram showing steps in accordance with an embodiment of the present invention;

FIGS. 5a (i) to 5h (i) are histograms showing matching score against depth for a pixel in the reference image, FIG. 5a (iii) to 5h (iii) shows the results of a probabilistic depth model of the data of row (i) and FIG. 5a (ii) to FIG. 5h (ii) show a parametric model approximation to the model results of row (iii);

FIG. 6a shows a plot of how the estimate of the depth plotted along the y axis converges over data from further images plotted along the x axis, FIG. 6b shows a plot of the probability that the depth being derived in FIG. 6a is good against the number of images along the x axis and FIG. 6c shows the measurement histogram with matching probability for a plurality of images against possible depth;

FIG. 7 is a schematic used to explain the calculations performed by a system in accordance with an embodiment of the present invention;

FIG. 8a is a picture of a model which is to be imaged, FIG. 8b is benchmark 3D image generated from the model of FIG. 8a, FIG. 8c shows the results of a prior art method where 30 2D frames are combined to form the 3D image, FIG. 8d shows the results of the continuous method of the present invention produced after 30 frames and FIG. 8e shows the results of the present invention after 600 frames;

FIGS. 9a-f show a display generated in accordance with an embodiment of the present invention in FIG. 9a, a small number of 2D images have been captured and the number of images captured increases to produce the figures shown in FIG. 9f; and FIGS. 10a-d show images produced from a method in accordance with an embodiment of the present invention.

Figure 1:
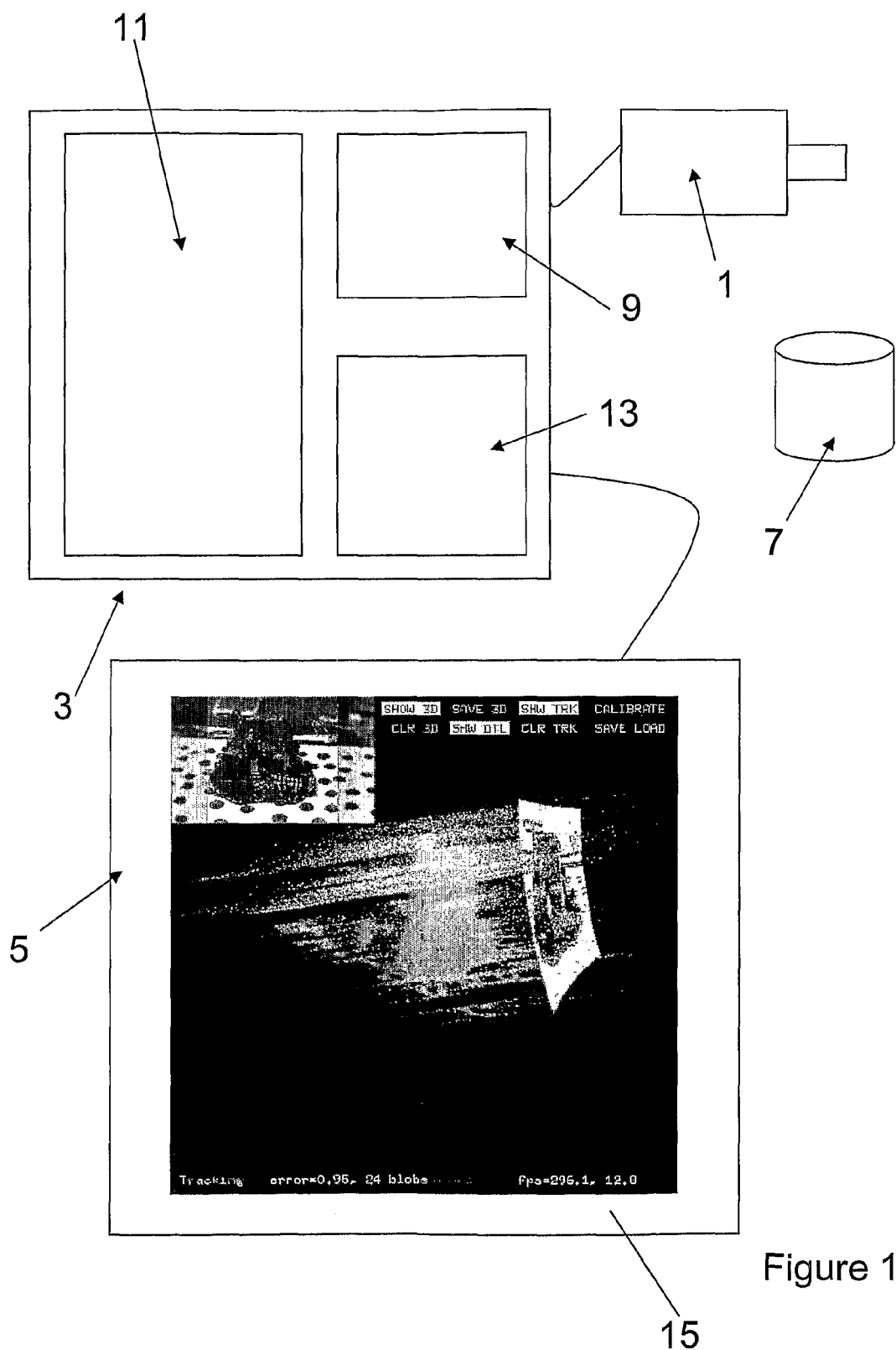
FIG. 1 shows an imaging system in accordance with an embodiment of the present invention.

FIG. 1 shows a system in accordance with an embodiment of the present invention. The system basically comprises a camera 1, a computer 3 and a display 5.

The camera 1 is a standard video camera and can be moved by a user. In operation, the camera 1 will be freely moved around object 7 which is to be imaged. In a preferred embodiment, the camera will not be mounted on a tripod or other mechanical support device, it is simply handheld.

The computer 3 comprises a section for receiving the camera data from camera 1. The camera data receiving section 9 is in communication with processor 11. Processor 11 is configured to process the data in accordance with an embodiment of the present invention. Once the data has been processed, it is then converted into the form of a depth map and output via data output section 13 to display 5.

The display shows the 3D image as it is slowly being built up. Although the figure is in black and white, in a preferred embodiment, when displayed on a computer screen the possible data points change colour as a confidence level in the point increases. Once the point reaches a pre-determined colour, the user knows that enough data concerning that part of the object have been gathered and that the camera can be moved on to another part of the object. The system will determine the depth of many points at once.

As the camera is moved around object 7, more and more data is acquired. As this data is acquired, it is continually processed in real time and builds up the figure of object 7 on the screen. By providing this automatic feedback, it is possible for one using the camera to see which parts of the object 7 need to be revisited in order to build up a depth profile of the object.

Figure 2:
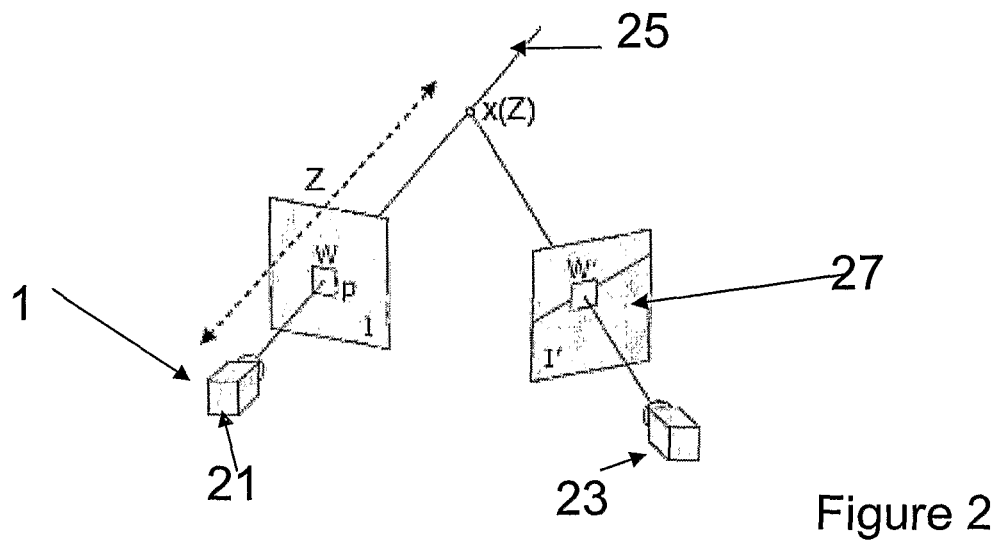
FIG. 2 is a schematic demonstrating operation of a system in accordance with an embodiment of the present invention where an image of point x is taken at two different positions by the same camera.

FIG. 2 is a schematic which is used to explain a method in accordance with an embodiment of the present invention. Camera 1 is moved between first position 21 which will be referred to as the first image position and second position 23 which will be referred to as the further image position. In the first image I, a pixel p is shown. In pixel p, point x (Z) is shown on the object. The point x (Z) lies at a distance (Z) from a reference point. In this specific example, the reference point is camera 1. However, the reference point could be any point. The point x which is shown at pixel p lies along epipolar line 25. From the data in 2D image I, it is impossible to judge the depth Z. However, the position of the line along which Z lies can be determined.

When camera 1 is moved to section position 23, the image I', is captured. As it is known that point x lies along line 25, it is possible to project this line onto image space I' and therefore one skilled in the art will know that the point x on the object (not shown) will lie somewhere along the projected line 27 in image space I'.

The position of projected line 27 can easily be determined once the position of the camera at the first position 21 and the second position 23 are known. Further, as the images are captured by a continually moving video camera, the distance between position 21 and position 23 is very small. In order to provide a clear diagram, in FIG. 2, the difference between these two positions has been exaggerated. In reality, this difference will be very small therefore the pixel p at which point x is shown in the reference image will only move within a small area w from the image taken in the first position I to the image in the second position I'.

This area w when projected onto the second image I' as w' then means that it is only pixels which fall along the projection of epi-polar line 27 within the projection of area w' that need to be processed to look for similarity with the pixel p.

A known matching algorithm is then performed to see if the pixels along line 27 match with pixel p. Correspondence scores can be evaluated using systems such as normalized cross correlation (NCC), sum of absolute differences (SAD) or another metric on w and w'.

A plot of the matching score or similarity score is shown in FIG. 3a for distances between band Z min and Z max. It has been found that in well textured scenes, the correct depth is typically very close to a local maxima of a matching score. Therefore, just the local maxima which will be denoted as $x_1, \ldots, x_N$ are considered from hereon.

The distance Z can be projected onto the second image I'. The first approximation of the distance Z will be based on some information concerning the general size of the object.

As the system is operating, the camera will then move to a third position (not shown in FIG. 2), in the third position, the same analysis can be performed and a similarity score can be performed in the same manner as described with reference to FIG. 2 for position 23.

The two similarity scores can be then added together. The scores for both further images are represented in terms of Z along the epi-polar line 25. In FIG. 3b, the similarity scores from six frames are added together. When there are only very few images taken as in the case shown in FIG. 3b, the local maxima is heavily multi-modal. This is due to various pathologies in the problem domain such as occlusion, time warping, repetitive texture etc. In FIG. 3c, further similarity scores the similarity scores from 15 frames are added and in FIG. 3d the similarity scores from 60 frames are added.

It is important to note that as more and more images are added, the multimodel histogram which is initially shown in FIG. 3b is see to move to be more unimodal in character as shown in FIG. 3d. Here, the data is converged to a clearly defined peak with a significant percentage of uncorrelated outlier data points. The matching score maxima for each incoming video frame reinforces each other gradually removing the ambiguities in the pixel depth.

FIG. 4 is a flow chart showing steps of the method in accordance with an embodiment of the present invention. In step S101, two 2 dimensional image data is collected by a video camera as explained with reference to FIGS. 1 to 3.

One of the frames is denoted as a first frame in step S103. The first frame will be used to construct the epipolar line 25 shown in FIG. 2 for a pixel p. However, as image capture continues, further frames may be denoted as the first frame for other pixels.

In step S105, the camera position for each frame is determined. This may be done by a number of methods. For example, it is possible to determine the position of the cameras purely from multiple measurements of the object itself and matching points on the objects across multiple frames. It is also possible to determine the position of the cameras if the system is provided with information concerning parts of the object. In a preferred embodiment, the object is provided on a marker mat, the size of features on the marker mat and their position being known to the system to allow calibration.

In step S107, matching scores are then obtained which indicate the similarity between a pixel which shows a part of said object in the reference frame and a plurality of pixels in a further frame. This is described with reference to FIG. 2.

The matching scores are obtained for a plurality of frames. In step S109, the depth of said feature is determined from a plurality of further images. As explained with reference to FIGS. 3a-d, as the data for more and more images is collected, the histogram evolves from being multimodal to substantially unimodal in character. Also, when many images are available, in addition to the unimodal distribution around the depth, the histogram has an additional DC component. This comes from the aforementioned failure cases of the matching score function that typically do not cluster in the same depth locations.

With this transition from a first image where a multi-modal distribution is seen to a final histogram where there is a single mode with a DC background. In a preferred embodiment, in order to determine this transition, a probabilistic depth sensor is constructed.

The role of the probabilistic depth sensor is to provide a parameter based approach to determine this transition.

First, the local maxima which are observed in the matching score for example see FIG. 3a are defined as $x_1, \ldots x_N$ as a set of noisy measurements coming from a depth sensor.

The depth sensor can produce two types of measurements with a probability $\pi$ and $1-\pi$ respectively:
(1) a good measurement that is normally distributed around the correct depth Z; or
(2) a outlier measurement that is uniformly selected from the interval $[Z_{min}, Z_{max}]$.

The limit $Z_{min}$ and $Z_{max}$ can be determined by some prior knowledge of the geometry of the object, for example, the longest dimensions. For example, if the object is located on a mat, then the dimensions of the mat can be used. In this example the distance 2 is measured from a midpoint in the object along the epipolar line.

The object of interest is guaranteed to be entirely contained between $Z_{min}$ and $Z_{max}$. The following Gaussian plus uniform mixture model describes the probability of obtaining the $t^{th}$ measurement given the correct depth location Z and the inlier probability $\pi$ $$P(x_t|Z,\pi)=\pi N(x_t|Z,\tau_t^2)+(1-\pi)U(x_t|Z_{min},Z_{max}) \qquad \text{(Eqn. 1)}$$

The variance of a good measurement $\tau_t^2$ can be reliably calculated from the relative position of the cameras at frame I and I' that produce the measurement. This is because it is assumed that the measurement $x_t$ has a fixed variance of 1 pixel when projected in I'. This variance is then lifted in 3D space to produce the variance of the measurement in distance units. This will be described with reference to FIG. 7.

The likelihood of (equation 1 above) is a typical mixture model such as parameters can be readily estimated from the data $x_1, \ldots x_N$ using expectation minimization (EM). However, in a preferred embodiment, the estimation process is formulated as Bayesian posterior estimation for the following reasons:
1) The estimation problem must be performed for about a million pixels independently with possibly thousands of depth measurements for each pixel. EM would not be feasible from a memory or computation perspective as it needs to have access to all data before proceeding. Also, incremental versions of EM where found to be too slow to converge and too dependent on the ordering of measurements.
2) It is desirable to maintain a degree of confidence in the estimate which is not provided in a maximum likelihood framework such as EM. This confidence can be used to understand when enough measurements have been obtained as well as to know when the estimation has failed.

Assuming that all measurement $x_1, \ldots x_N$ are independent, the posterior probability can be obtained from:

$$P\left(Z, \pi | x_1 \ldots x_N\right) \alpha P(Z, \pi) \prod_t P(x_t|Z, \pi).$$

This can be formulated in terms of Bayesian update equation as follows:

$$P(Z,\pi|x_1\ldots x_N)\alpha P(x_t|Z,\pi)P(Z,\pi|x_1\ldots x_{t-1}) \qquad \text{Eqn. 2}$$

for $t=1 \ldots N$. Referring to FIGS. 5a-h, three rows are shown for each of the figures. The first row (i) is a histogram showing the row data gathered as described with reference to FIG. 3a-d.

FIGS. 5a-d show results for a pixel p where the results converge. FIGS. 5e-h show results which do not converge.

In FIG. 5a, the results are shown after five updates, i.e. one first image and five further images. FIGS. 5b and f show the results after 10 updates, FIGS. 5c and g show the results up to 20 updates and FIGS. 5d and h show the results after 100 updates.

Row (iii) shows snap shots of the evolution of $P(Z,\pi|x_1 \ldots x_t)$ over time, where the distribution is modelled using a dense 2D histogram as described above. The distribution converges to the correct values for Z and $\pi$. However, modelling posterior with a full 2D histogram for each pixel is also impractical due to memory limitations.

As explained above the heavy multi-modal distribution quickly converges to a single mode after a few measurements (for example, see FIG. 5c which shows the results after 20 measurements). This motivates the use of a unimodal parametric approximation to the posterior probability.

This is achieved using the product of a Gaussian with a beta distribution to produce:

$$p(Z,\pi|a_t,b_t,\mu_t,\sigma_t) := \text{Beta}(\pi|a_t,b_t)N(Z|\mu_t,\sigma_t^2) \qquad \text{Eqn. (3)}$$

as the parametric approximation to the posterior probability shown in equation 2 above after the $t^{th}$ measurement. Given the posterior parameters after the $(t-1)^{th}$ measurement $a_{t-1}$, $b_{t-1}$, $\mu_{t-1}$, $\sigma_{t-1}^2$, the posterior distribution has the form $$CxP(x_t|Z,\pi)p(Z,\pi|a_{t-1},b_{t-1},\mu_{t-1},\sigma_{t-1}^2) \qquad \text{Eqn. 4}$$

for some constant C. This distribution is no longer of the form Beta×Gaussian but it can be approximated using moment matching. Therefore, new parameters $a_t$, $b_t$, $\mu_t$, $\sigma_t^2$ are defined such that the equation 4 can be written as the following distribution:

$$p(Z,\pi|a_t,b_t,\mu_t,\sigma_t^2)$$

and share the same first and second order moments for Z and $\pi$.

This parametric approximation is shown in row (ii) of FIGS. 5a-h. The distribution gives a high probability to a very low inlier ratio. In the case when this happens, it is an indication that the estimation has failed and the results can be disregarded.

Looking a FIGS. 5a-d, it can be seen that the parametric approximation (row (ii)) converges by the time 20 updates have been received. However, in the pixel shown in FIGS. 5e-h, the parametric approximation does not converge by the time of 20 updates (FIG. 5g) nor by the time that 60 updates have been received (FIG. 5h). Therefore, it can be said that this data will not converge.

FIGS. 6a, b and c demonstrate further evolution of how the depth estimate is achieved.

FIG. 6a, the depth estimate is shown as a mean (thick line) and standard deviation (2 outer lines).

In FIG. 6b, the inlier probability $\pi$ is shown which can be seen to converge again, the mean value as shown in the standard deviation.

FIG. 6c shows the histogram data with a parametric model data (solid line) superimposed on top thus showing that the parametric model has a converged to the correct depth.

Using the above, the profile of the object can be determined as described with reference to step S109 of FIG. 4.

Next, the 3D image can is constructed in step S111.

A full system will now be discussed.

Systems are available which can track 6 degrees of freedom motion of a camera from point and line features in a video sequence of a ridged scene. Here, a planar pattern is used where the features are detected and tracked a camera frame-rate of 60 hertz with a mean projection error of about 0.1 pixels. In a preferred embodiment the object is located on a mat having a pattern of a plurality of circles. A pattern with a plurality of circles allows easy recognition of the correct camera position (see FIG. 8a).

The problem of estimating the depth Z alone an optic ray passing through pixel p away from the image plane I is an inference problem. When constructing a 3 dimensional depth profile of a sample, it is necessary to solve many of these inference problems. As each inference problem will require computing power and memory to perform all inference problems for all points on the object as once. Each inference problem is termed a "seed".

Due to memory and computational limitations, a fixed number of seeds is maintained throughout the process. Each seed is associated with a set of parameter values ($a_t$, $b_t$, $\mu_t$, $\rho^2_t$, W). Parameters $a_t$, $b_t$, $\mu_t$, $\sigma^2_t$ describe the depth Z and the inlier ratio $\pi$ for that pixel.

The first two $a_t$ and $b_t$ are two parameters of the Beta distribution of equation 3. These probabilistic counters of how many inlier and outlier measurements have occurred during the lifetime of the seed.

The other two parameters $\mu_t$ and $\sigma^2_t$ represent the mean and variance of the Gaussian depth estimate. In practice, it is convenient to store them as two 3D points $x_{-o}$ and $x_o$ that are located on the optic ray and $-\sigma_t$ and $\sigma_t$ distance units away from the depth $\mu_t$. This economically encapsulates the distribution parameters $\mu_t$ and $\sigma_t$ as well as the 3D optical ray on which the depth Z is measured.

With each seed, a reference image patch w at the location of the corresponding pixel at the reference image of the seed is also stored. This patch is used to compared against target matches to obtain depth measurements. When a seed created, the initial parameters are set $a_0=10$ and $b_0=10$. The depth parameter is $\mu_t$ and $\sigma_t$ are set such that 99% of the prior probability mass is between preset $Z_{min}$ and $Z_{max}$. These limits define a bounding volume inside which the object of interest must lie.

During the lifetime of the seed, depth measurements are obtained by searching for the reference patch in the current video frame to obtain the epipolar line that contains the match of the seed pixel p. This is shown in FIG. 7.

In the ideal case, the entire epipolar line would be searched. However, as previously explained, due to the small motion between frames, if the current estimate of the depth is reasonable, it is only necessary to search within a radius of w pixels away from the projection of the prior mean $\mu_t$.

This violates the assumption of independence of the depth sensor measurements because previous measurements will dictate the search region for new measurements.

However, in spite of this, the approximation works well in practice and there is no significant drop in performance.

Figure 8:
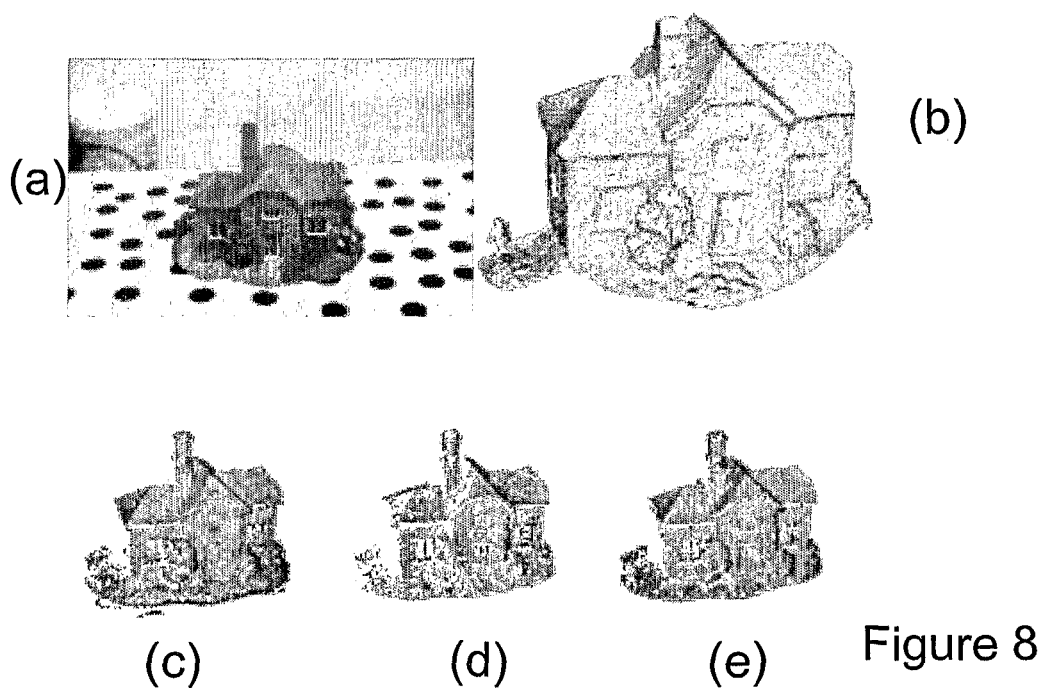

In the experimental data which is shown in FIG. 8, w is set at 3 pixels for a 2 million pixel camera. The matching score between the reference patch and patches within this of the epipolar line. The local maxima of the matching score collected in $x_1$ to $x_N$. Then, the new posterior distribution parameters $a_{t+1}$, $b_{t+1}$, $\mu_{t+1}$ and $\sigma^2_{t+1}$ are calculated by matching the first and second order moments at Z and $\pi$ between $$P(x_1|Z,\pi) \ldots P(x_m|Z,\pi)p(Z,\pi|a_t,b_t,\mu_t,\sigma_t^2)$$

and $$p(Z,\pi|a_{t+1},b_{t+1},\mu_{t+1},\rho_{t+1}^2)$$

In the case where no maxima is detected, the seed is penalised by setting $b_{t+}=b_t+1$. This has the same effect as observed in the depth measurement which is known with certainty to be an outlier.

Next, the seeds are pruned. After the seed evolution step described above, each seed is faced with three possibilities:

1) The seed has converged to a good estimate and therefore it is removed from the seed list and a 3D point is generated at the current posterior mean $\mu_t$.

2) The seed has failed to converge due to too many outliers present. The seed is then removed from the list.

3) The seed has not been left to converge long enough and therefore it survives to the next evolution step.

At each iteration, it is necessary to decide whether or not a seed has converged to the correct depth and also to see if it has a chance of eventually converging. The above framework provides such a decision criteria in the form of a variance of the depth posterior $\sigma^2_t$ and the estimated inlier probability $\pi$.

The following criteria is therefore used:

1) If according to the current posterior distribution $p(Z,\pi|a_t, b_t, \mu_t, \sigma_t^2)$, the inlier ratio $\pi$ is less than a threshold $\eta_{outlier}$ with a probability of 99%, then it can be concluded that the depth estimation has failed. This is typically caused when the seed is initialised on an image patch that was out of focus, or there was not enough texture to match in subsequent images.

2) If the inlier ratio is more than a threshold $\eta_{inlier}$, with a probability of 99% and the depth variance of $\sigma_t$ is less than E then we assume that the depth estimation has succeeded.

3) In all other cases, the seed is allowed to evolve further.

Figure 9:
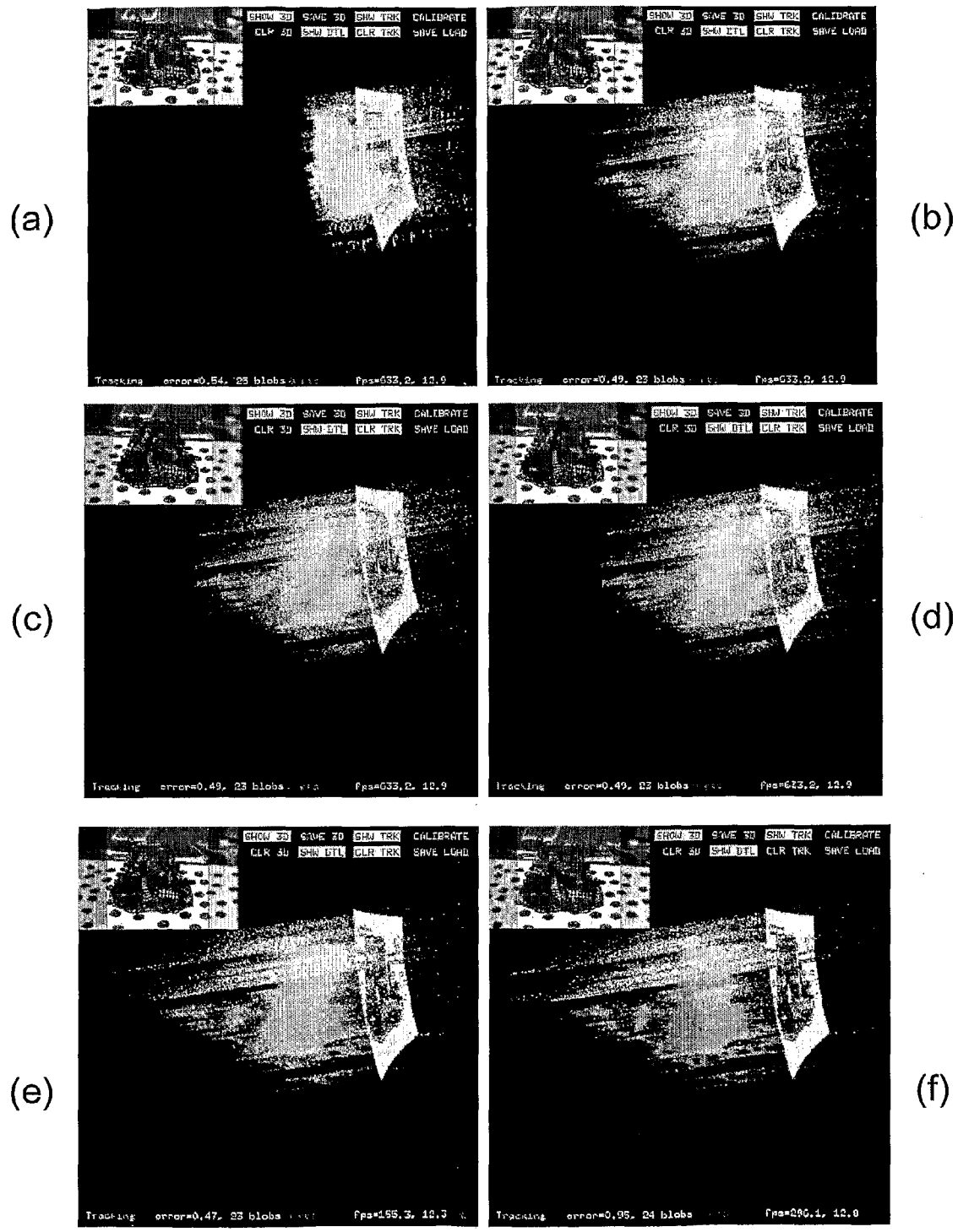
Figure 10:
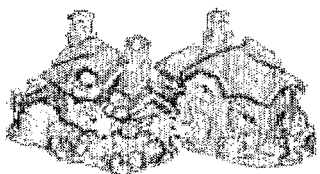
Figure 10:
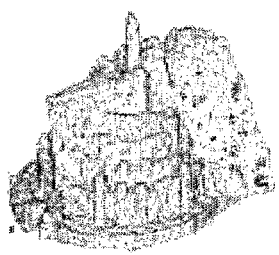
Figure 10:
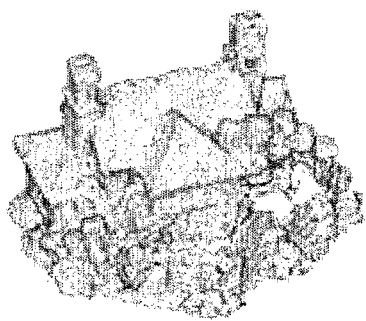
Figure 10:
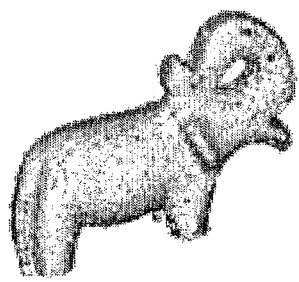

The typical value of the threshold parameter and $\eta_{outlier}=0.2$, $\eta_{inlier}=0.6$ and $\epsilon$ is $1/10000$ th of the bounding volume $Z_{max}-Z_{min}$. A typical evolution of the entire set of seeds is shown in FIG. 9 where the mean of the depth and inlier ratio is shown for the entire point cloud over time.

FIG. 9a-f show the convergence process. The points rendered represent the mean of the current depth distributions for each seed. As this is a black and white figure, the colours cannot be seen. However, in the preferred embodiment, each point will be associated with a colour which represents the mean inlier ratio. In the beginning this is close to 0.5 (brown) for most points. Eventually, it becomes much higher (red) for seeds that get many inliers and much lower (green) for seeds that do not get inliers. These typically correspond to pixels that are locations in regions of low focus or low texture variation. These seeds would eventually be discarded.

The generated 3D points are collected into a octree structure that is graphically rendered with a Z-buffer shading in real time.

In a preferred embodiment, the algorithm takes the form of:

Step 1—If S<MAX_SEEDS (where MAX_SEEDS is the total number of seeds which can be processed simultaneously), generate MAX_SEEDS-S with new seeds with $a_0=10$, $b_0=10$ and $(\mu_0, \sigma_0^2)$ are such that 98% of the prior probability mass is between some preset $Z_{min}$, and $Z_{max}$. Store in W a square patch at the seed's pixel location in the current image I Step 2—For each seed $(a_t, b_t, \mu_t, \sigma_t^2, W)$ (a) Project the 3D means of the depth prior to the current image I.

(b) Perform a 1D search along the epipolar line for local maxima of the matching score between W and patches in I (see FIG. 7) and collect these local maxima in $x_1 \ldots x_m$.

(c) Define $a_{t+1}$, $b_{t+1}$, $\mu_{t+1}$, $\sigma_{t+1}^2$ such that $$p(Z,\pi|a_{t+1},b_{t+1},\mu_{t+1},\sigma_{t+1}^2)$$

and $$P(x_1|Z,\pi) \ldots P(x_m|Z,\pi)p(Z,\pi|a_t,b_t,\mu_t,\sigma_t^2)$$

have the same first and second order moments of Z and $\pi$.

(d) If no local maximum was found set:
$\mu_{t+1}=\mu_t$
$\sigma^2_{t+1}=\sigma^2_t$
$a_{t+1}=a_t$
$b_{t+1}=b_t+1$ Step 3—Remove all seeds $(a_t, b_t, \mu_t, \rho_t^2, W)$ such that $\pi<\eta_{outlier}$ with 99% probability.

Step 4—Convert into 3d points (and remove from seed list) all seeds $(a_t, b_t, \mu_t, \sigma_t^2, W)$ such that (1) $\pi>\eta_{inlier}$ with 99% probability (2) and $\sigma_t<\epsilon$.

Experiments were performed where a video sequence consisting of 600 frames of a small model house with a resolution of 2 million pixels. Also, 30 images with a static 8 million pixel camera were also collected.

The high resolution images were used to obtain a very accurate 3D surface reconstruction using a known method. This was subsequently used as a benchmark against which 3 different strategies were compared:

1) use of the above continuous stereo algorithm on the entire sequence (600 frames)

2) use of the continuous stereo algorithm on the entire sequence (600 frames) on every $20^{th}$ frame (30 frames in total).

3) use of the same 30 frames as above to compute a series of 2-view dense stereo depth-maps obtained with a simple implementation. The depth maps were computed from consecutive pairs of frames so in turn of the original video sequence we will compute depth maps for frames 0 and 20, 20 and 30 and 30 and 40 etc.

For each strategy, a point cloud of about half a million vertices was obtained. This was then compared against the benchmark mesh by computing histograms of a point cloud to mesh distance.

The results are summarized below:

| Strategy | Mean Distance | Std. Deviation |
| --- | --- | --- |
| 30 Pairs of Depthmaps | 1.93 mm | 2.48 mm |
| Continuous estimate (30 Frames) | 1.22 mm | 1.71 mm |
| Continuous estimate (600 Frames) | 1.11 mm | 1.65 mm |

The sequence of regularised 2-view stereo depth maps performs worse than the un-regularised continuous depth estimation in accordance with an embodiment of the present invention which operates in the same set of images.

This is due to the fact that the method in accordance with an embodiment of the present invention fully exploits the temporal continuity of the depth maps. The performance in accuracy improves even more when all 600 frames are added to the depth estimation.

FIG. 8a shows one of the frames of the video sequence. FIG. 8b shows the benchmark reconstruction using a high definition camera.

FIG. 8c shows the results of fusing 30 two-view depth maps. FIG. 8d shows the results of a method in accordance with the present invention using a continuous depth estimate result operating on the same images as one and FIG. 8e shows the results of the algorithm on all 600 images.

The sequence of regularised two-view stereo depth maps performs worse than the un-regularised continuous depth estimation operating on the same set of images. This is due to the fact that the present invention fully exploits the temporal continuity of the depth maps. The performance in accuracy improves even more when all 600 frames are added to the depth estimation.

FIGS. 10(a) to (d) show images which were collected within about 40 seconds. The models have not been regularised or post-processed in any way.

The invention claimed is:

1. A system for generating a 3D depth profile of an object, the system comprising:
   a moveable video camera configured to continually capture 2D image data of said object as said camera is moved, said image data being captured as a plurality of 2D image frames where each frame comprises a plurality of pixels;
   a processor configured:
   to receive said 2D image data;
   to determine the position of the camera for each frame captured;
   to calculate the depth of the part of an object shown in a pixel in a first frame, said depth being determined with respect to a reference, said depth being determined by identifying said part of the object in at least one further frame and calculating the depth using the camera positions of said first frame and said at least one further frame,
      wherein said depth is calculated by determining the similarity of a pixel in said first frame with a plurality of pixels in said at least one further frame, said plurality of pixels in said further frame being located along an epipolar line in said further frame, said epipolar line representing the possible depths of said part of the object;
      wherein a matching score indicating the similarity of a pixel in the first frame with a pixel in said further frame is determined for the pixels along said epipolar line, and potential matches for said pixel in the first frame are selected as local maxima for said matching score when dependent on depth,
      wherein said matching scores as a function of depth for a plurality of images are combined to determine a single value for the depth of said part of object,
      wherein the distribution of the matching score against depth is modelled as a mixture of a uniform distribution and a unimodal distribution,
      wherein a weighting is given to said unimodal distribution, said weighting indicating the probability that the depth indicated by said unimodal distribution is a good measurement;
      wherein the parameters of said model are estimated using Bayesian Posterior Estimation;
      wherein said model is approximated by a distribution of the type:

$$Cxp(x_t|Z,\pi)p(Z,\pi|a_{t-1},b_{t-1},\mu_{t-1},\sigma_{t-1}^2)$$

where $x_t$ is a $t^{th}$ point, Z is the depth, $\pi$ is the weighting, a and b are parameters of a beta distribution and $\mu$ and $\sigma^2$ are the mean and standard deviation of said unimodal distribution; and
   to determine a depth profile of said object, the depth profile being determined for a plurality of parts of the object shown in said pixels,
   the system further comprises a display configured to display said depth profile and an indication in real time as data is still being gathered, the parts of the object for which the depth profile has been calculated.

2. A system according to claim 1, wherein the distance through which the camera has moved between said first frame and said further frame is used to determine the number of pixels along said epipolar line which are processed to determine their similarity in said further frame.

3. A system according to claim 1, wherein the depth of said object is calculated when the distribution of matching scores against depth for a plurality of image becomes substantially unimodal in character.

4. A system according to claim 1, wherein the unimodal distribution is a Gaussian distribution.

5. A system according to claim 1, wherein the processor attempts to determine the depth for adjacent pixels in said first image.

6. A depth sensor for determining the depth of a part of an object from a reference, said system comprising:
   a moveable video camera configured to continually capture 2D image data of said object as said camera is moved, said image data being captured as a plurality of 2D image frames where each frame comprises a plurality of pixels;
   a processor configured:
   to receive said 2D image data;
   to determine the position of the camera for each frame captured;
   to identify the part of the object whose depth is to be measured in a first frame;
   to determine matching scores indicating the similarity of a pixel showing said part of the object in a first frame with each of a plurality of pixels in a further frame as a function of the depth of said part of the object, said depth being determined using the camera positions of said first frame and said further frame;
   to obtain the matching scores as a function of depth for a plurality of further frames and combining said matching scores as a function of depth with previously obtained matching scores;
   to continually monitor the distribution of the matching scores as a function of depth as data from further frames is combined; wherein said processor is configured to model said distribution as a mixture of a unimodal distribution and a uniform distribution and apply a weighting factor to said unimodal distribution, said weighting providing an indication of when said distribution evolves to be substantially unimodal;
      wherein the parameters of said model are estimated using Bayesian Posterior Estimation;
      wherein said model is approximated by a distribution of the type:

$$Cxp(x_t|Z,\pi)p(Z,\pi|a_{t-1},b_{t-1},\mu_{t-1},\rho_{t-1}^2)$$

where $x_t$ is a $t^{th}$ point, Z is the depth, $\pi$ is the weighting, a and b are parameters of a beta distribution and $\mu$ and $\sigma^2$ are the mean and standard deviation of said unimodal distribution;
   to determine the depth of said part of said object when said distribution of the matching scores as a function of depth becomes substantially unimodal.

7. A system according to claim 1, wherein said matching score is determined by Normalized Cross Correlation or Sum of Absolute differences.

8. A system according to claim 1, further comprising a mat upon which said object is located, said mat having a known pattern which is used to calculate the position of the camera for each frame.

9. A system according to claim 8, wherein said mat has a pattern comprising a plurality of circles.

10. A method for generating a 3D depth profile of an object, the method comprising:

continually capturing 2D image data of said object using a moveable video camera said image data being captured as a plurality of 2D image frames where each frame comprises a plurality of pixels;

determining the position of the camera for each frame captured;

calculating the depth of the part of an object shown in a pixel in a first frame, said depth being determined with respect to a reference, said depth being determined by identifying said part of the object in at least one further frame and calculating the depth using the camera positions of said first frame and said at least one further frame;

wherein said depth is calculated by determining the similarity of a pixel in said first frame with a plurality of pixels in said at least one further frame, said plurality of pixels in said further frame being located along an epipolar line in said further frame, said epipolar line representing the possible depths of said part of the object;

wherein a matching score indicating the similarity of a pixel in the first frame with a pixel in said further frame is determined for the pixels along said epipolar line, and potential matches for said pixel in the first frame are selected as local maxima for said matching score when dependent on depth, wherein said matching scores as a function of depth for a plurality of images are combined to determine a single value for the depth of said part of object, wherein the distribution of the matching score against depth is modelled as a mixture of a uniform distribution and a unimodal distribution, wherein a weighting is given to said unimodal distribution, said weighting indicating the probability that the depth indicated by said unimodal distribution is a good measurement;

wherein the parameters of said model are estimated using Bayesian Posterior Estimation;

wherein said model is approximated by a distribution of the type:

$$Cxp(x_t|Z,\pi)p(Z,\pi|a_{t-1},b_{t-1},\mu_{t-1},\sigma_{t-1}^2)$$

where $x_t$ is a $t^{th}$ point, Z is the depth, $\pi$ is the weighting, a and b are parameters of a beta distribution and $\mu$ and $\sigma^2$ are the mean and standard deviation of said unimodal distribution;

determining a depth profile of said object, the depth profile being determined for a plurality of parts of the object shown in said pixels, and displaying said depth profile and an indication in real time as data is still being gathered, the parts of the object for which the depth profile has been calculated.

11. A method of determining the depth of a part of an object from a reference, said method comprising:

continually capturing 2D image data of said object using a moveable video, said image data being captured as a plurality of 2D image frames where each frame comprises a plurality of pixels;

determining the position of the camera for each frame captured;

identifying the part of the object whose depth is to be measured in a first frame;

determining matching scores indicating the similarity of a pixel showing said part of the object in a first frame with each of a plurality of pixels in a further frame as a function of the depth of said part of the object, said depth being determined using the camera positions of said first frame and said further frame;

obtaining the matching scores as a function of depth for a plurality of further frames and combining said matching scores as a function of depth with previously obtained matching scores;

continually monitoring the distribution of the matching scores as a function of depth as data from further frames is combined;

wherein said processor is configured to model said distribution as a mixture of a unimodal distribution and a uniform distribution and apply a weighting factor to said unimodal distribution, said weighting providing an indication of when said distribution evolves to be substantially unimodal;

wherein the parameters of said model are estimated using Bayesian Posterior Estimation;

wherein said model is approximated by a distribution of the type:

$$Cxp(x_t|Z,\pi)p(Z,\pi|a_{t-1},b_{t-1},\mu_{t-1},\sigma_{t-1}^2)$$

where $x_t$ is a $t^{th}$ point, Z is the depth, $\pi$ is the weighting, a and b are parameters of a beta distribution and $\mu$ and $\sigma^2$ are the mean and standard deviation of said unimodal distribution; and determining the depth of said part of said object when said distribution of the matching scores as a function of depth becomes substantially unimodal.

12. A non-transitory computer readable storage medium comprising computer executable instructions that when executed by a computer will cause the computer to carry out the method of claim 10.

\* \* \* \* \*